(12) United States Patent
Lu

(10) Patent No.: US 6,220,759 B1
(45) Date of Patent: Apr. 24, 2001

(54) POSITIONING PIVOT

(76) Inventor: Sheng-Nan Lu, No. 174, Chunying St., Shulin Chen, Taipei Hsien (TW)

(*) Notice: Subject to any disclaimer, the term of this patent is extended or adjusted under 35 U.S.C. 154(b) by 0 days.

(21) Appl. No.: 09/382,617

(22) Filed: Aug. 25, 1999

Related U.S. Application Data

(63) Continuation-in-part of application No. 08/744,651, filed on Nov. 6, 1996, now Pat. No. 5,713,672.

(51) Int. Cl.$^7$ .................................................. F16C 17/02
(52) U.S. Cl. ......................................................... 384/398
(58) Field of Search ................................. 384/398, 399, 384/378, 396, 416

(56) References Cited

U.S. PATENT DOCUMENTS

| | | | |
|---|---|---|---|
| 5,713,672 | * | 2/1998 | Lu ........................................ 384/289 |
| 6,039,399 | * | 3/2000 | Whalen et al. ...................... 384/209 |

* cited by examiner

*Primary Examiner*—Lenard A. Footland
(74) *Attorney, Agent, or Firm*—Welsh & Katz, Ltd.

(57) ABSTRACT

A positioning pivot including a shaft having a first portion, a second portion and a third portion, a sleeve and a hinge butt and is able to prolong its life span by inserting the third portion into the sleeve and the second portion into a first collar of the hinge butt. With the helical grooves defined in the second and the third portions, the helical slits defined in the sleeve and the first collar are able to disperse the lubricant over a larger area and thus provide the proper friction therebetween.

5 Claims, 4 Drawing Sheets

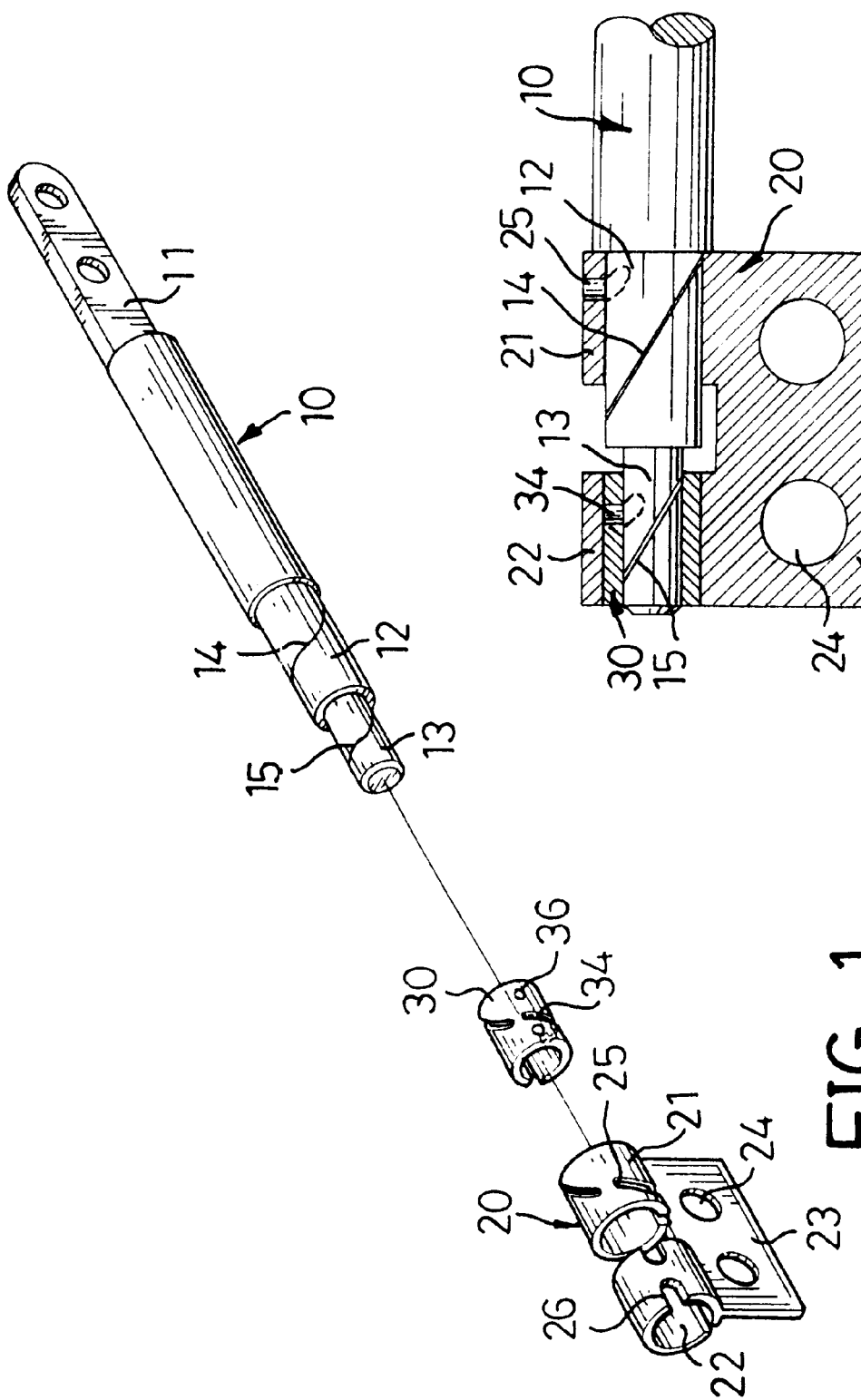

US 6,220,759 B1

POSITIONING PIVOT

This is a continuation-in-part of Ser. No. 08/744,651, filed Nov. 6, 1996, now the U.S. Pat. No. 5,713,672, issued to Sheng-nan Lu on Feb. 3, 1998. The specification thereof is hereinafter incorporated for reference.

FIELD OF THE INVENTION

The present invention generally relates to a positioning pivot, and more particularly to a positioning pivot which is able to provide a proper friction caused by the rotation of the sleeves securely received within the collar of the positioning pivot.

BACKGROUND OF THE INVENTION

Positioning pivots are commonly used in many casing structures such as notebook computers. As shown in FIG. 5, a conventional positioning pivot comprises a shaft (90) having a first portion (92) with at least one first through holes (93) to connect with an object and a second portion (94) with a helical groove (96) defined on the surface. A hinge butt (80) includes at least one collar (82) and an extension (84) integrally formed therewith. The extension (84) of the hinge butt (80) has at least one second through hole (86) defined therein. The second portion (94) of the shaft (90) is rotatably received within the collar (82) of the hinge butt (80), after the first through hole (93) is securely connected to an object, such as a screen (not shown), and the second through hole (86) of the extension (84) is securely connected to a computer (not shown). The positioning pivot of this type can indeed provide a pivot effect to the objects which the positioning pivot connects with. However, the friction between the second portion (94) of the shaft (90) and the collar (82) will gradually enlarge the clearance therebetween and thus causes a loose connection. In order to mitigate the above mentioned problem, a helical lubrication groove (96) is defined in the outer periphery of the second portion (94) of the shaft (90) and lubricant (not shown) will thus be spread from the lubrication groove (96) to the surface of the second portion (94). Therefore, the friction between the second portion (94) of the shaft (90) and the collar (82) of the hinge butt (80) is greatly reduced after the second portion (94) is inserted into the collar (82).

Nevertheless, the lubricant spread onto the surface of the second portion (94) of the shaft (90) can only lubricate part thereof because the rotation between the collar (82) and the second portion (94) is limited within a certain arc of rotation.

To enhance the lubrication effect between the second portion (94) and the collar (82), as shown in FIG. 6, a new type of positioning pivot is introduced.

The positioning pivot also has a shaft (90) with a first portion (92) that has at least one first through hole (93) for connecting the positioning pivot to an object, such as a screen (not shown), and a second portion (94) with a helical lubrication groove (96) defined in the surface. The positioning pivot further has at least one sleeve (70) having at least one protrusion (72) formed on an outer peripheral wall thereof, a helical slit (73) defined therein and a hinge butt (80A) having at least one collar (82) provided with at least one cutout (83) defined to correspond to the at least one protrusion (72) and an extension (84) integrally formed therewith and provided with at least one second through hole (86) for connecting with an object, such as a computer (not shown). The helical slit (73) of the sleeve (70) is oriented opposite to the orientation of the helical groove (96) of the second portion (94) of the shaft (90), such that lubricant in the helical groove (96) of the second portion (94) is able to be dispersed to a larger portion when the shaft (90) is rotated manually by a user. Accordingly, after the sleeve (70) is inserted into the hinge butt (80A) to have the at least one protrusion (72) received in the cutout (83) and securely retained therein, there will be no relative movement between the collar (82) and the sleeve (70), but between the sleeve (70) and the second portion (94) of the shaft (90). After assembly, the lubrication effect of the structure as shown in FIG. 5 is not satisfied, however, the lubrication effect of the structure as shown in FIG. 6 provides a smooth pivot between the shaft (90) and the hinge butt (80A). However, the structure as shown in FIG. 6 provides more lubrication than necessary, such that the screen may fall to the computer base during operation. In order to provide a positioning pivot, which is able to provide a moderate lubrication effect, alternation or modification to the present structure is necessary.

From the previous description, it is noted that a positioning pivot as described above is not able to fulfill the practical requirements.

Thus, a positioning pivot constructed in accordance with the present invention tends to mitigate and/or obviate the aforementioned problems.

SUMMARY OF THE INVENTION

The main objective of the invention is to provide a positioning pivot, which is able to expand the lubrication effect between the inner parts thereof and thus prolong its life span.

Another objective of the invention is to provide a positioning pivot that is able to provide the proper friction between the second portion of the shaft and the sleeve so that a user is able to position the screen at any desired angle.

Other objects, advantages and novel features of the invention will become more apparent from the following detailed description when taken in conjunction with the accompanying drawings.

BRIEF DESCRIPTION OF THE DRAWINGS

FIG. 1 is an exploded perspective view of the positioning pivot in accordance with the present invention;

FIG. 2 is side plan view partially cross-sectional of the assembled positioning pivot in FIG. 1;

DETAILED DESCRIPTION OF THE PREFERRED EMBODIMENT

Figure 3:
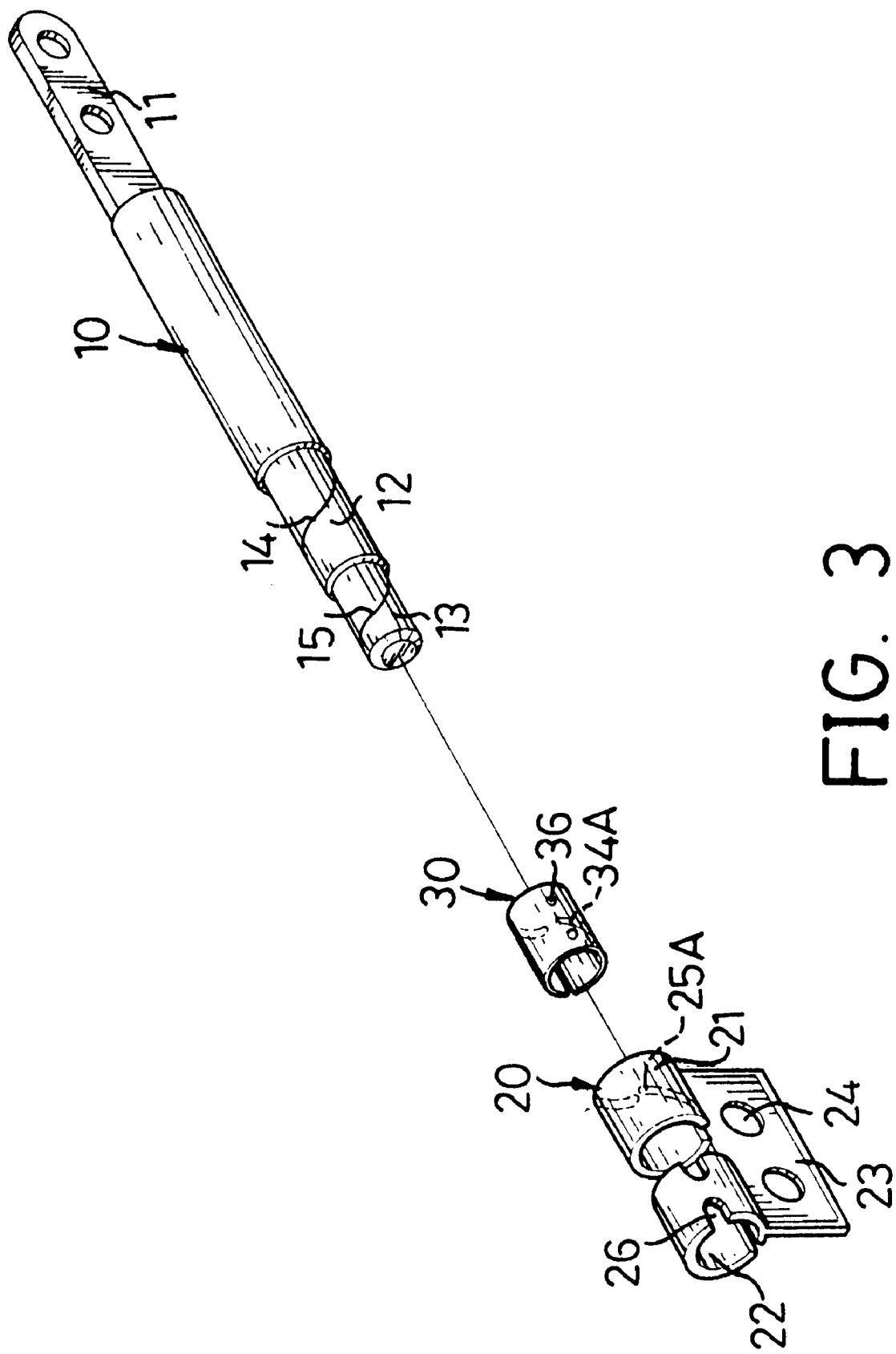
FIG. 3 is an exploded perspective view of another preferred embodiment of the positioning pivot in accordance with the present invention.
Figure 4:
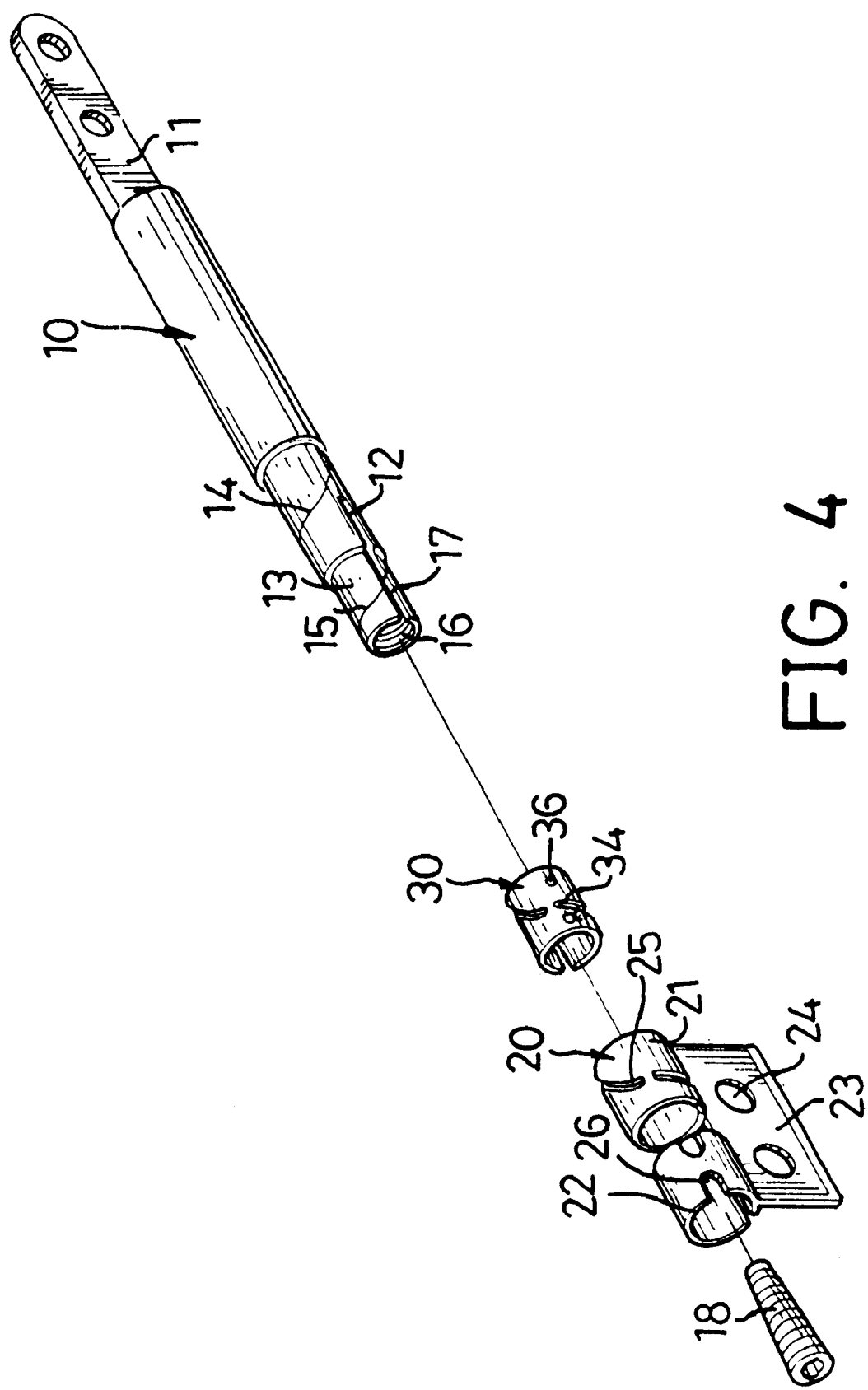
FIG. 4 is an exploded perspective view of still another preferred embodiment of the invention.
Figure 6:
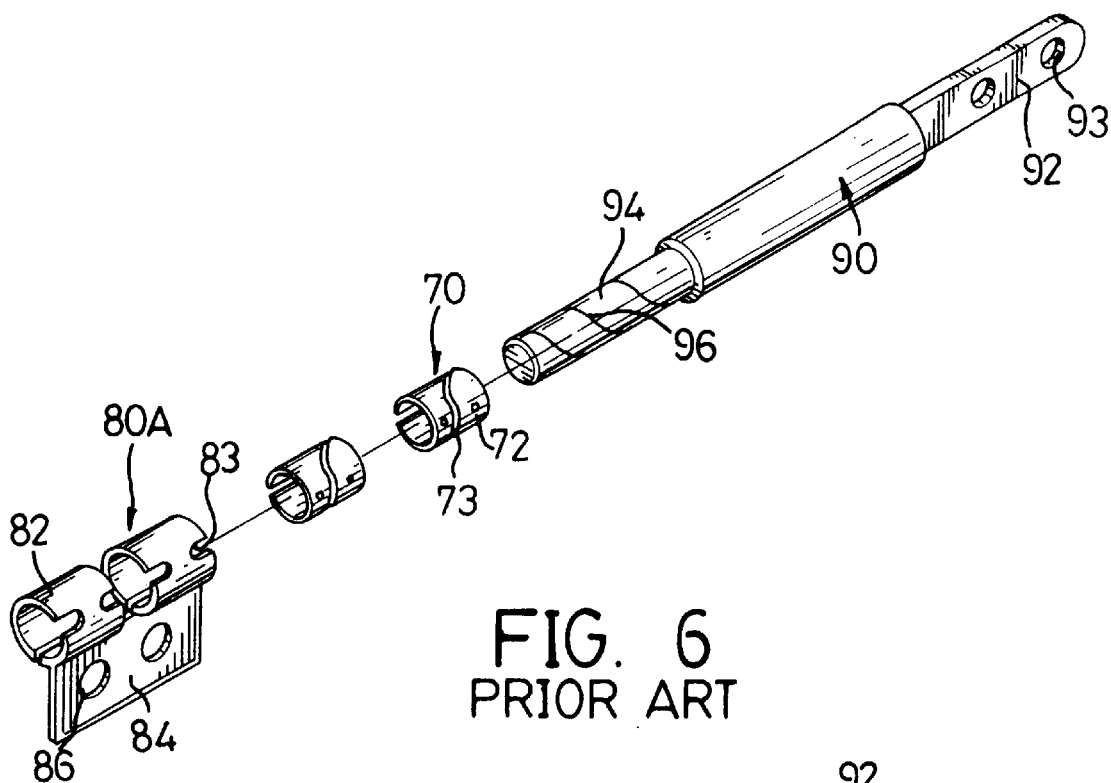
FIG. 6 is an exploded perspective view of another conventional positioning pivot.
Figure 5:
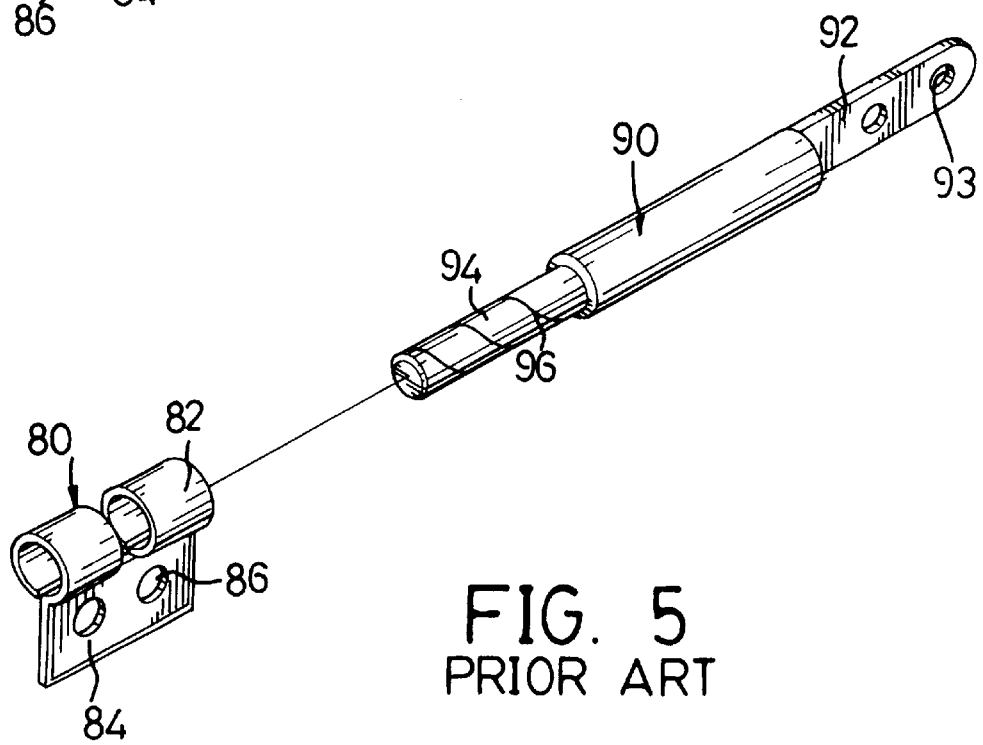
FIG. 5 is an exploded perspective view of a conventional positioning pivot.

With reference to FIGS. 1 and 2, the positioning pivot in accordance with the present invention comprises a shaft (10) having a first portion (11) with at least one through hole (111), a second portion (12) having a first helical groove (14) defined on the outer periphery and a third portion (13) having a second helical groove (15) defined on the outer periphery. The second portion (12) has a diameter larger than that of the third portion (13). The positioning pivot of the present invention further has a C-shaped sleeve (30) pivotally mounted around the third portion (13) and provided with a first helical slit (34) peripherally defined therein and at least one protrusion (36) formed on the outer peripheral wall. A hinge butt (20) has a C-shaped first collar (21), a C-shaped second collar (22) and an extension (23) integrally formed therewith. The first collar (21) is aligned with the second collar (22) and has a second helical slit (25) defined through the periphery thereof. The second collar (22) has at least one cutout (26) defined to correspond to the protrusion (36) of the sleeve (30). The second portion (12) of the shaft (10) is pivotally received in the first collar (21), and the sleeve (30) is securely received in the second collar (22) after the third portion (13) is pivotally received in the sleeve (30). The first helical slit (34) of the sleeve (30) is oriented opposite to the orientation of the second helical groove (15) of the third portion (13), and the second helical slit (25) of the first collar (21) is oriented opposite to the orientation of the first helical groove (14) of the second portion (12) of the shaft (10), such that the lubrication effect between the second portion (12) and the first collar (21) and between the sleeve (30) and the third portion (13) will be able to provide the proper friction for the user to position an object, such as a screen, at the desired angle. Referring to FIG. 2, the first helical slit (34) and the second helical slit (25) are respectively defined through the periphery of the sleeve (30) and the first collar (21). With reference to FIGS. 3, it is noted that the first helical slit (34A) and the second helical slit (25A) are defined in the periphery of the sleeve (30) and the first collar (21) respectively. With reference to FIG. 4, it is noted that the third portion (13) further has a blind hole (16) longitudinally defined therein and a slit (17) defined to communicate with the blind hole (16). After a period of time of using the invention, the friction between the third portion (13) and the sleeve (30) will enlarge the clearance therebetween. To overcome the loose connection between the third portion (13) and the sleeve (30), an adjusting plug (18) is inserted into the blind hole (16) of the third portion (13). The insertion of the adjusting plug (18) into the blind hole (16) will expand the third portion (13) and thus regain the proper friction.

It is concluded that the positioning pivot of the invention has the following advantages:

Better Lubrication

Because the orientation of the first helical groove (14) and the second helical slit (25) is different and the orientation of the second helical groove (15) and the first helical slit (34) is also different, when the third portion (13) is pivoted in the sleeve (30) and the second portion (12) is pivoted in the first collar (21), the lubricant will be dispersed over a larger area than that of the conventional one.

From the foregoing, it is seen that the objects previously set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A positioning pivot comprising
    a shaft provided with a first portion at one end thereof, and a second portion on the other end thereof the second portion having a first helical groove defined therein and a third portion formed on the free end thereof and provided with a second helical groove defined in a periphery thereof;
    a sleeve having the third portion of the shaft pivotally received therein and provided with at least one protrusion and a first helical slit; and
    a hinge butt having a first collar pivotally receiving the second portion of the shaft therein and with a second helical slit, a second collar securely receiving the sleeve therein and an extension integrally formed therewith and provided with at least one through hole;
    the first portion having at least one through hole defined therein;
    the orientation of the first helical groove and the second helical slit being differently orientated and the orientation of the second helical groove and the first helical slit being differently orientated.

2. The positioning pivot as claimed in claim 1, wherein the third portion of the shaft is configured to have a blind hole longitudinally defined therein.

3. The positioning pivot as claimed in claim 2 further comprising an adjusting device, which is able to be inserted into the blind hole of the shaft to enlarge the diameter thereof.

4. The positioning pivot as claimed in claim 1, where the first helical slit is peripherally defined in the sleeve and the second helical slit is defined through the face of the first collar.

5. The positioning pivot as claimed in claim 1, wherein the first helical slit is defined through the face of the sleeve and the second helical slit is peripherally defined in the face of the first collar.

* * * * *